Patented Oct. 24, 1950

2,526,718

UNITED STATES PATENT OFFICE 2,526,718

COATING COMPOSITIONS

Gordon K. Wheeler, Norwalk, Conn., assignor to R. T. Vanderbilt Co., Inc., New York, N. Y., a corporation of New York No Drawing. Application August 20, 1948, Serial No. 45,421

20 Claims. (Cl. 106—264)

1

This invention relates to coating compositions of improved properties.

Certain drying oil compositions, due chiefly to their chemical composition, do not dry as rapidly as may be desired. Furthermore, other drying oil compositions, such as paints and printing inks, frequently exhibit poor drying time stability upon aging. The aforementioned deficiencies tend to limit the utility of many drying oil compositions.

In addition, certain organic salts of metals, such as the naphthenates, oleates and octoates of lead, cobalt, calcium and manganese, accelerate the drying rate of drying oil compositions. It is well known, however, that many paints, such as those pigmented with titanium dioxide or carbon black pigments, containing the normal amounts of the aforementioned metallic driers, exhibit poor drying time stability upon the aging of the composition. The addition of "excess" metallic driers, beyond the amount normally required to dry the composition, is sometimes practiced, in order to prevent the change in drying time upon the aging of the composition. However, due to certain deficiencies, such as color, reactivity, brittleness of film, and poor durability upon exposure to heat, light, moisture, chemicals, etc., it is often desirable to limit the amount of metallic driers in such a drying oil composition or even to dispense with the use of such driers.

The foregoing being in brief the state of the art, it is therefore an object of the present invention to provide drying oil compositions of accelerated drying rate.

It is also an object of this invention to provide drying oil compositions having improved drying time stability during the aging of the compositions.

It is a further object of this invention to provide drying oil compositions of accelerated drying rate even without the use of metallic driers.

In addition, it is an object of this invention to provide drying oil compositions pigmented with titanium dioxide or carbon black, which compositions are characterized by improved drying time stability upon the aging of the compositions.

Other objects will appear hereinafter.

The foregoing and other objects are accomplished in accordance with the present invention by providing a composition comprising a film-forming base, of the type commonly employed in varnishes, enamels, paints, printing inks and linoleum print paints, containing a drying or semi-drying oil fatty acid radical and also containing as a drier o-phenanthroline, o-phenanthroline monohydrate or alpha, alpha'-dipyridyl. As is understood in the art, o-phenanthroline is a compound having the structural formula

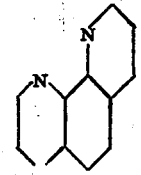

and alpha, alpha'-dipyridyl is a compound having the structural formula

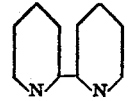

The following disclosure teaches in detail the preparation of a variety of compositions which fall within the broad scope of the present invention. Example I describes the method of determining the drying rates of the compositions prepared as described in the remaining examples.

Example I

Within 15–72 hours after preparation of the compositions, a film is applied on a polished plate glass panel by means of a 0.004 inch "Bird" film applicator which delivers a wet film thickness of approximately 0.0022 inch, depending upon the viscosity and flow characteristics of the composition being tested. The film is allowed to dry under a constant artificial light source consisting of two 100-watt incandescent lamps suspended five feet above the panels and five feet apart in a room wherein the relative humidity is maintained at 50% and the temperature at 70° F. The air within the room is renewed approximately every two minutes.

The drying times of the films are determined by a weighted-felt method wherein a strip of cotton flannel one inch wide and two and one-half inches long is fastened to a 10-gram block of wood one inch square on the bottom so that the bottom face of the block is completely covered by the flannel with the lint side exposed. The flannel covered block is then carefully placed on the film, with the flannel covered bottom face in contact with the film, and allowed to remain there for 300± three seconds, after which time the panel is inverted by rotating in a direction 90° to a line passing through the length of the flannel, the time consumed in the operation being approximately two seconds. Tests are made at half-hour intervals during the first four hours, one hour intervals during the next four hours, and at two hour intervals during the next twelve hours.

The film is considered to be dry if the flannel covered block drops off immediately upon inversion of the panel and this dry-point will hereinafter be referred to as the 10-gram lint-free drying time, abbreviated 10-gm. L. F. D. T. A 500-gram lint-free drying time, abbreviated 500-gm. L. F. D. T., is similarly determined by placing a 490-gram lead weight on top of the 10-gram block for a period of 300± three seconds and then removing this weight before inverting the panel, with the exception that the tests are made at half-hour intervals for the first eight to twelve hours, at one-hour intervals for the next eight hours, at two-hour intervals for the next eight hours, and at four-hour intervals for the balance of the testing period. In some instances it is desirable to make tests between these intervals depending upon the expected drying time of the composition being tested.

*Example II*

This example illustrates the modification with o-phenanthroline monohydrate of an oleoresinous enamel based on a Z-bodied linseed oil and a modified phenolic resin.

A twelve and one-half gallon oil length vehicle of viscosity U and acid number 12 is prepared by heating 100 parts of Z-bodied linseed oil with 100 parts of a rosin-modified phenolic resin (high viscosity, melting point 161–169° C.) to a temperature of 500° F. in about 30 minutes. The mixture is allowed to cool to 390° F. and 133 parts of mineral spirits are added with mixing. To 150 parts of this vehicle are added 300 parts of pure rutile titanium dioxide with thorough mixing, and the resulting paste is then given two passes through a high speed three-roll paint mill. To 450 parts of this paste are added 550 parts of the vehicle, 12.6 parts of 10% lead naphthenate solution, and 10.5 parts of 1.0% cobalt naphthenate solution to give 0.6% lead and 0.05% cobalt metal based on the oil content of the enamel. To this finished enamel, 1022.9 parts, are added 18.9 parts of a 5% solution of o-phenanthroline monohydrate dissolved in a mixture of equal parts of butyl alcohol and toluene wherein the o-phenanthroline monohydrate is first dissolved by warming in the butyl alcohol and the toluene then added. This amount of solution is equivalent to 0.45% of o-phenanthroline monohydrate based on the oil content of the enamel.

The enamel is tested according to the manner described in Example I and it is found that films from this modified enamel dry more rapidly than unmodified films. It is also found that this modified enamel exhibits much better drying time stability during aging than a corresponding unmodified enamel. Typical 500-gram lint-free drying times for the modified enamel are 12, 11, 11, 12 and 14 hours, respectively, at the age of 0, 4, 20, 48 and 220 weeks, whereas the unmodified enamel dries in 15, 20, 26, 28 and 30 hours, correspondingly.

*Example III*

The use of o-phenanthroline monohydrate to modify a baking enamel pigmented with titanium dioxide and containing a modified phenolic resin linseed oil vehicle is illustrated in the following example.

Films of the enamels described in Example II are applied according to the manner described in Example I and are baked at 200° F. for 0.5 hour. The films are allowed to cool and are then tested with a "Sward" hardness rocker in the usual manner. It is found that the modified enamel gives a much harder film than the unmodified enamel. Typical results of the baking test are as follows:

|  | "Sward" hardness |
|---|---|
| Unmodified enamel | 16 |
| Modified enamel | 22 |

*Example IV*

The use of o-phenanthroline monohydrate to accelerate the rate of set-up of an oleoresinous enamel based on a Z-bodied linseed oil and a modified phenolic resin without the use of conventional metallic driers is illustrated by the following example.

A twelve and one-half gallon length modified phenolic resin Z-bodied linseed oil vehicle is prepared as illustrated in Example II. To 150 parts of this vehicle are added 300 parts of pure rutile titanium dioxide with thorough mixing and the resulting paste is then given two passes through a high speed three-roll paint mill. To 450 parts of this paste are added 550 parts of the vehicle and 18.9 parts of a 5% solution of o-phenanthroline monohydrate dissolved in a mixture of equal parts of butyl alcohol and toluene wherein the o-phenanthroline monohydrate is first dissolved by warming in the butyl alcohol and the toluene then added. This modified enamel is tested under the conditions described in Example I by touching lightly with the finger every two hours. It is found that films from this modified enamel set-up (are dry to touch) more rapidly than films of a corresponding unmodified enamel.

*Example V*

This example illustrates the modification with alpha, alpha'-dipyridyl of an oleoresinous enamel based on a Z-bodied linseed oil and a modified phenolic resin.

To 1022.9 parts of the finished enamel, described in Example II, are added 18.9 parts of a 5% solution of alpha, alpha'-dipyridyl dissolved in a mixture of equal parts of butyl alcohol and toluene wherein the alpha, alpha'-dipyridyl is first dissolved by warming in the butyl alcohol. This amount of solution is equivalent to 0.45% alpha, alpha'-dipyridyl, based on the oil content of the enamel. The enamel is tested according to the manner described in Example I and it is found that, initially, films from this modified enamel dry much more rapidly than unmodified films. It is also found that this modified enamel exhibits much better drying time stability during aging than a corresponding unmodified enamel. Typical 500-gram lint-free drying times for the modified enamel are 14, 12, 12 and 14 hours, respectively, at 0, 4, 20 and 48 weeks, whereas the corresponding drying times for an unmodified enamel are 17, 22, 26 and 29 hours.

*Example VI*

The use of o-phenanthroline monohydrate to modify an oleoresinous enamel based on a Z-bodied linseed oil modified phenolic resin vehicle and pigmented with carbon black is illustrated by this example.

A mixture of 12.5 parts of carbon black pigment (diphenyl guanidine adsorption index=55) and 355 parts of a twelve and one-half gallon modified phenolic resin Z-bodied linseed oil vehicle, described in Example II, and 50 parts of mineral spirits is ground in a ball mill for 96 hours. Two parts of 10% lead naphthenate solution, 1.65 parts of 6% cobalt naphthenate solution, and 2.0 parts of 5% calcium naphthenate solution are then added. To this finished enamel are added 10 parts of a 5% solution of o-phenanthroline monohydrate dissolved in a mixture of equal parts of butyl alcohol and toluene wherein the o-phenanthroline monohydrate is first dissolved by warming in the butyl alcohol and the toluene then added.

The 500-gram lint-free drying time is determined according to the method described in Example I and it is found that films of the modified enamel dry considerably faster than those of an unmodified enamel. It is also found that the modified enamel exhibits excellent drying time stability upon aging of the composition whereas an unmodified enamel exhibits very poor drying time stability.

*Example VII*

This example illustrates the modification with o-phenanthroline monohydrate of an oleoresinous enamel containing a chrome green pigment.

To 125 parts of the rosin modified phenolic resin Z-bodied linseed oil vehicle (12.5 gallon length), described in Example II, are added 250 parts of C. P. Chrome Green pigment (Sp. gr. 5.53, oil absorption 14, composition 98% chrome yellow, 2% iron blue) with thorough mixing and the resulting paste is given three passes through a three-roll high speed paint mill. To 375 parts of this paste are added 575 parts of the vehicle, 4.0 parts of 10% lead naphthenate solution, 3.3 parts of 6% cobalt naphthenate solution, and 4.0 parts of 5% calcium naphthenate solution to give 0.2% lead, 0.1% cobalt, and 0.1% calcium as metals based on the oil content of the vehicle. To 961.3 parts of this finished enamel are added 20 parts of a 5% solution of o-phenanthroline monohydrate dissolved in a mixture of equal parts of butyl alcohol and toluene wherein the o-phenanthroline is first dissolved by warming with the butyl alcohol and the toluene then added.

This modified enamel is tested according to the method described in Example I. It is found that this modified enamel exhibits greatly improved drying-time stability on aging compared to an unmodified enamel. Typical 500-gram lint-free drying times, at the age of 0, 4, and 12 weeks for the modified enamel are 12, 12 and 16 hours, respectively, whereas an unmodified enamel dries in 12, 16 and 28 hours, correspondingly.

*Example VIII*

This example illustrates the modification with o-phenanthroline monohydrate of an oleoresinous enamel containing an iron blue pigment.

A mixture of 200 parts of C. P. Iron Blue pigment (Chinese blue, sp. gr. 1.82, oil absorption 41), 50 parts of pure rutile titanium dioxide, 625 parts of a rosin modified phenolic resin Z-bodied linseed oil vehicle (12.5 gallon length), described in Example II, and 100 parts of mineral spirits is ground in a ball mill for 72 hours. Four parts of 10% lead naphthenate solution, 3.34 parts of 6% cobalt naphthenate solution and 4 parts of 5% calcium naphthenate solution are then added. To this finished enamel are added 20 parts of a 5% solution of o-phenanthroline monohydrate made by dissolving 5 parts of o-phenanthroline monohydrate in 47.5 parts of butyl alcohol with warming and then adding 47.5 parts of toluene with stirring.

Films of this modified enamel are tested in the manner described in Example I and it is found that this modified enamel exhibits improved drying time stability on aging of the composition, compared to a correspondng unmodified enamel.

*Example IX*

The use of o-phenanthroline monohydrate to modify an enamel based on an ester gum resin dehydrated castor oil vehicle is illustrated by this example.

A 30-gallon oil length vehicle is prepared by heating 240 parts of a $Z_3$ viscosity dehydrated castor oil to 580° F. in about 30 minutes. The temperature is maintained at 580° F. until a complete string is obtained. The reaction is then checked by adding 100 parts of a low acid ester gum (acid number 5-7) and keeping the temperature above 450° F. for five minutes. The mixture is then allowed to cool to 390° F. and 227 parts of mineral spirits are then added with thorough stirring. To 150 parts of this vehicle are added 300 parts of pure rutile titanium dioxide with thorough mixing and the resulting paste is given two passes through a high speed three-roll paint mill. To 450 parts of this paste are added 550 parts of the vehicle, 12 parts of 10% lead naphthenate solution, 2.0 parts of 6% cobalt naphthenate solution, and 4.0 parts of 4% manganese naphthenate solution to give 0.4% lead, 0.04% cobalt, and 0.06% manganese metals, based on the oil content of the enamel. To this finished enamel (1018 parts) are then added 20 parts of a 5% solution of o-phenanthroline monohydrate dissolved in a mixture of equal parts of butyl alcohol and toluene wherein the o-phenanthroline monohydrate is first dissolved in butyl alcohol by warming and the toluene then added. This amount of solution is equivalent to 0.34% o-phenanthroline monohydrate based on the oil content.

Upon testing this modified enamel in the usual manner, as described in Example I, it is found that the films exhibit greatly accelerated 10-gram lint-free drying times compared to those of a corresponding unmodified enamel. It is also found that the modified enamel possesses excellent drying time stability upon aging of the composition. Typical 10-gram lint-free drying times for the modified enamel are 3.5 and 3.5 hours at the age of 0 and 8 weeks, respectively.

*Example X*

This example illustrates the use of o-phenanthroline monohydrate to modify a commercial enamel pigmented with titanium dioxide and containing a substantial amount of dehydrated castor oil and lead, cobalt, and manganese driers.

Twelve parts of a 5% solution of o-phenanthroline monohydrate dissolved in a mixture of equal parts of butyl alcohol and toluene, wherein the o-phenanthroline monohydrate is first dissolved by warming in the butyl alcohol and the toluene then added, are added to 1600 parts of a commercial enamel pigmented with titanium dioxide and containing a substantial amount of dehydrated castor oil and lead, cobalt, and manganese naphthenates as driers.

When tested according to the manner described in Example I, it is found that films from this modified enamel dry more rapidly than unmodified films. It is also found that this modified enamel exhibits greatly improved drying time stability during aging compared to a corresponding unmodified enamel. Typical 500-gram lint-free drying times for the modified enamel are 7.5, 7.0, and 6.5 hours at the age of 0, 4 and 12 weeks, respectively, whereas the unmodified enamel dries in 14, 15 and 20 hours, correspondingly.

*Example XI*

The following example illustrates the use of o-phenanthroline monohydrate to modify an enamel based on a vehicle composed of a maleic resin and a chemically modified soya bean oil.

A twenty-five gallon oil length vehicle of viscosity U and acid number 6 is prepared by heating 400 parts of a chemically modified soya bean oil (iodine value 120-125 and acid number 10-14) to 560-580° F. in about 45 minutes. This temperature is maintained until a complete string is obtained. The reaction is checked by adding 200 parts of a maleic modified pentaerythritol ester of rosin (acid number 12-14 and softening point 155-160° C.), and the temperature held above 500° F. for 15 minutes. The mixture is allowed to cool to 390° F. and 400 parts of mineral spirits are added with mixing. To 75 parts of this vehicle are added 150 parts of pure rutile titanium dioxide with thorough mixing and the resulting paste is given two passes through a high speed three-roll paint mill.

To 225 parts of this paste are added 275 parts of the vehicle, 11 parts of 10% lead naphthenate solution, 2.35 parts of 6% cobalt naphthenate solution and 1.4 parts of 4% manganese naphthenate solution to give 0.8% lead, 0.1% cobalt and 0.04% manganese, as metals, based on the oil content of the enamel. To this finished enamel, 514.75 parts, are added 10 parts of a 5% solution of o-phenanthroline monohydrate dissolved in a mixture of equal parts of butyl alcohol and toluene wherein the o-phenanthroline monohydrate is first dissolved by warming in the butyl alcohol and the toluene then added. This amount of solution is equivalent to 0.36% of o-phenanthroline monohydrate based on the oil content of the enamel.

The enamel is tested according to the manner described in Example I and it is found that after 16 weeks films of the modified enamel dry faster than those of the unmodified enamel. Furthermore, it is found that the 500-gram L. F. D. T. of the modified enamel may be further accelerated by omitting the 11 parts of 10% lead naphthenate and 2.35 parts of 6% cobalt naphthenate solutions. The resulting modified enamel, containing 1.4 parts of 4% manganese naphthenate solution and 10 parts of 5% o-phenanthroline solution as driers, exhibits an accelerated drying rate after 16 weeks, and dries in about one-half the time required by an unmodified enamel which contains the above parts of lead, cobalt, and manganese naphthenate solutions.

*Example XII*

The use of o-phenanthroline monohydrate to accelerate the drying rate of an oil modified alkyd resin enamel pigmented with titanium dioxide is illustrated by this example.

A well mixed paste of 300 parts of pure rutile titanium dioxide, 200 parts of a short oil (37% oil acids content) soya alkyd resin solution of 50% solids, and 25 parts of mineral spirits is ground twice through a high speed three-roll paint mill. The resulting paste is mixed with 400 parts of the alkyd resin solution, 75 parts of mineral spirits, 12 parts of 10% lead naphthenate solution and 2.0 parts of 6% cobalt naphthenate solution. The resulting enamel is then modified by adding 20 parts of a 5% o-phenanthroline monohydrate solution prepared by dissolving 5 parts of o-phenanthroline monohydrate in 47.5 parts of warm butyl alcohol and then adding 47.5 parts of toluene with stirring. This amount of solution is equivalent to a concentration of 0.33% o-phenanthroline monohydrate based on the solids content of the alkyd resin solution.

Films of this modified enamel are tested according to the manner described in Example I and it is found that they exhibit an accelerated drying rate compared to films of an unmodified enamel.

*Example XIII*

This example illustrates the use of o-phenanthroline monohydrate to modify a carbon black pigmented pentaerythritol phthalic oil modified alkyd enamel.

A mixture of 25 parts of carbon black pigment (diphenyl guanidine adsorption index=55), 710 parts of a pentaerythritol phthalic oil modified alkyd solution containing 70% solids, and 100 parts of mineral spirits is ground in a ball mill for 96 hours. To this mixture are added 3.3 parts of 6% cobalt, 4.0 parts of 10% lead, and 4.0 parts of 5% calcium naphthenate solutions. This finished enamel is then modified by adding 20 parts of a 5% solution of o-phenanthroline monohydrate prepared by dissolving the latter in a mixture of equal parts of butyl alcohol and toluene wherein the o-phenanthroline monohydrate is first dissolved by warming in the butyl alcohol and the toluene then added with stirring.

When tested according to the manner described in Example I, it is found that this enamel exhibits improved drying time stability in comparison to a corresponding enamel which contains no o-phenanthroline monohydrate. It is also found that, after several weeks, films from the o-phenanthroline monohydrate modified enamel dry much faster than unmodified films. Typical 500-gram lint-free drying times of the modified enamel films are 10, 10 and 13 hours at the age of 0, 4 and 8 weeks, respectively, whereas films from an unmodified enamel dry in 8, 16 and 20 hours, correspondingly.

*Example XIV*

This example illustrates the modification of a red barn and roof paint with o-phenanthroline monohydrate.

A mixture of 30 parts of Indian red, 2.6 parts of Tuscan red, 50 parts of English whiting, 30 parts of heavy bodied linseed oil, 10 parts of raw linseed oil and 0.2 part of aluminum stearate are ground in a ball mill until a fineness of 3.5-4.5 is obtained as measured with a "North Standard" fineness gauge. To this mixture of 122.8 parts are added with stirring 10 parts of raw linseed oil, 10 parts of mineral spirits, 6.0 parts of a 3% aqueous soap solution, 0.7 part of 6% manganese naphthenate solution, and 0.5 part of 6% cobalt naphthenate solution. The resulting red barn and roof paint is then mixed at room temperature with 3.75 parts of a 5% solution of o-phenanthroline monohydrate prepared by dissolving 5 parts of o-phenanthroline monohydrate in 47.5 parts of warm butyl alcohol and then adding with stirring 47.5 parts of toluene. This amount of solution is equivalent to 0.38% o-phenanthroline monohydrate based on the oil content of the paint.

This paint is tested according to the method described in Example I and it is found that films from this modified red barn and roof paint dry to the 10-gram lint-free point more rapidly than those of an unmodified paint. Furthermore, it is found that the 10-gram lint-free drying time may be further accelerated by omitting the 0.5 parts of 6% cobalt naphthenate solution from the modified red barn paint, whereas the omission of the cobalt naphthenate from the unmodified paint prolongs the 10-gram lint-free drying time. It is also found that these modified red barn paints exhibit improved 10-gram lint-free drying time stability, compared to corresponding unmodified paints. Typical 10-gram lint-free drying times for these paints are:

|  | 10-Gram Lint-Free Drying Times | | |
| --- | --- | --- | --- |
|  | Initial | Age 4 Wks. | Age 8 Wks. |
|  | Hours | Hours | Hours |
| Modified composition: |  |  |  |
| A. Containing Manganese drier only | 4 | 4 | 4½ |
| B. Containing Manganese and Cobalt driers | 8 | 7 | 8 |
| Unmodified composition: |  |  |  |
| A. Containing Manganese drier only | 12 | 14 | 21 |
| B. Containing Manganese and Cobalt driers | 11 | 12 | 12 |

Example XV

The use of o-phenanthroline monohydrate to accelerate the drying rate of raw linseed oil without the use of conventional metallic driers is illustrated by this example.

To 100 parts of raw linseed oil are added 0.45 part of o-phenanthroline monohydrate. The mixture is then heated to about 115° C. and the heating is maintained, with constant stirring, until the o-phenanthroline monohydrate is completely dissolved.

Films are applied on plate glass by means of a 0.004" "Bird" film applicator and are tested under the conditions described in Example I, by touching lightly with the finger every eight hours. It is found that films from this modified drying oil set-up (are dry to touch) more rapidly than films of an unmodified oil.

Example XVI

The use of alpha, alpha'-dipyridyl to modify raw linseed oil, without the use of conventional metallic driers, is illustrated by this example.

To 100 parts of raw linseed oil are added 0.45 parts of alpha, alpha'-dipyridyl and the mixture is then stirred at about 115° C. until the alpha, alpha'-dipyridyl is completely dissolved.

Films are applied on plate glass using a 0.004" "Bird" film applicator and are tested under the conditions described in Example I by touching lightly with the finger every eight hours. It is found that films from this modified drying oil set-up more rapidly than corresponding films of unmodified raw linseed oil.

Example XVII

This example illustrates the use of o-phenanthroline monohydrate to modify raw soya bean oil.

To 100 parts of raw soya bean oil are added 0.45 part of o-phenanthroline monohydrate and the mixture is then stirred at about 115° C. until the o-phenanthroline monohydrate is completely dissolved.

Films are applied on plate glass using a 0.004" "Bird" film applicator and are tested under the conditions described in Example I by touching lightly with the finger every eight hours. It is found that films from this modified drying oil set-up more rapidly than corresponding films of unmodified raw soya bean oil.

Example XVIII

This example illustrates the use of o-phenanthroline monohydrate to accelerate the drying rate of bodied linseed oils without the use of metallic driers.

To 100 parts of each of three bodied linseed oils having a viscosity of Q, Z, and $Z_3$ are added, separately, 0.45 part of o-phenanthroline monohydrate. The oils are then heated to about 115° C. until the o-phenanthroline monohydrate is completely dissolved.

Films of these modified bodied linseed oils are tested under the conditions described in Example I by touching lightly with the finger every eight hours, and in each case it is found that they set-up (are dry to touch) more rapidly than films of the corresponding unmodified oils.

Example XIX

The use of o-phenanthroline monohydrate to accelerate the drying rate of blown oils without the use of conventional metallic driers is illustrated by this example.

Mixtures of 100 parts of each of three different blown oils, namely, blown linseed, blown soya, and blown castor, and 0.45 part of o-phenanthroline monohydrate are heated at about 115° C. with stirring until the o-phenanthroline monohydrate is completely dissolved.

Films of these modified blown oils are tested under the conditions described in Example I by touching lightly with the finger every eight hours, and in each case it is found that they set-up (are dry to touch) more rapidly than films of the corresponding unmodified oils. The benefits obtained by the use of o-phenanthroline monohydrate in these blown oils is particularly pronounced in the case of the modified blown linseed oil, which sets-up in about 30 hours, whereas the unmodified blown linseed oil requires about 84 hours.

Example XX

The modification of dehydrated castor oil with o-phenanthroline monohydrate is illustrated by this example.

A mixture of 100 parts of dehydrated castor oil ($Z_3$ viscosity) and 0.45 part of o-phenanthroline monohydrate is heated at about 115° C. with stiring until the latter is completely dissolved in the oil.

Thin films of this modified dehydrated castor oil, which contains no metallic driers, are tested under the conditions described in Example I by touching lightly with the finger every eigth hours, and it is found that they set-up (are dry to touch) more rapidly than unmodified films.

In the preceding examples the word "parts" means weight units, the viscosities are on the Gardner-Holdt scale, and the film hardness is reported as per cent based on plate glass as 100% as determined with the Sward hardness rocker.

Various modifications may be made in the specific teachings of the examples to provide additional compositions which fall within the broad scope of the present invention.

Thus, the film-forming base, instead of being prepared using linseed oil, dehydrated castor oil or soya bean oil as is shown in the examples, may also be prepared using any of the other drying or semi-drying oils, such as raw, blown, heat-bodied or otherwise modified Chinawood oil, oiticica oil, sunflower oil, perilla oil, cashew nut oil, etc. In addition, the film-forming base may be prepared using the esters of the acids derived from the drying or semi-drying oils and polyhydric alcohols other than glycerol, for example, ethylene glycol, pentaerythritol, dipentaerythritol, sorbitol, mannitol, erythritol, etc. The film-forming base, if desired, may also be prepared using the pure esters of the drying or semi-drying oil fatty acids, such as linoleic acid, linolenic acid, oleic acid, ricinoleic acid, eleostearic acid, etc., and polyhydric alcohols, such as ethylene glycol, glycerol, pentaerythritol, dipentaerythritol, sorbitol, mannitol, erythritol, etc. As the examples further illustrate, the film-forming base may also be prepared from the drying or semi-drying oil modified resins which are customarily used in the art, such as the modified alkyd resins prepared, for example, by the esterification of glycerol, phthalic anhydride and drying or semi-drying oil fatty acids; the modified phenolic resins prepared, for example, by the reaction of cresols, formaldehyde and the drying or semi-drying oils; the modified esters of rosin or modified (hydrogenated, isomerized, polymerized, etc.) rosins prepared, for example, by the esterification of rosin, glycerol or pentaerythritol, and the drying or semi-drying oil fatty acids; etc.

The amount of o-phenanthroline or its monohydrate or alpha, alpha'-dipyridyl contained in the composition is not critical. In general, however, the composition should contain from about 0.15 to about 1.00 per cent, and preferably from about 0.25 to about 0.50 per cent, by weight of the aforementioned compounds, based upon the drying or semi-drying oil fatty acid radical content of the composition. If employed, the amounts of metallic driers (naphthenates, oleates, resinates, octoates, etc. of lead, cobalt, calcium, manganese, iron, etc.) contained in the composition are those customarily employed in the coating composition art.

As the examples illustrate, the o-phenanthroline or its monohydrate or alpha, alpha'-dipyridyl may be added to the finished composition by dissolving the compound in a solvent which is miscible and compatible with the remainder of the composition. On the other hand, in certain cases it may be desired to add the compound at some stage during the formulation of the composition, accompanied by moderate heating to effect solution of the modifier.

The composition of the present invention may also, if desired, include the usual pigments (e. g., titanium dioxide, calcium sulfate, zinc oxide, carbon black, chrome green, red iron oxide, etc.), extenders and fillers (e. g., calcium carbonate, clay, cork, wood flour, etc.), resins (e. g., paratertiary butyl or amyl phenol-formaldehyde, urea-formaldehyde, rosin, copal, kauri, congo, manila, dammar, etc.), solvents (e. g., butyl alcohol, toluene, xylol, turpentine, etc.), thinners such as mineral spirits, placticizers, etc.

I claim:

1. A film-forming base, of the type commonly employed in varnishes, enamels, paints, printing inks and linoleum print paints, prepared from an ester of a saturated, aliphatic, polyhydric alcohol, said ester containing a substituent selected from the group consisting of the drying and semi-drying oil fatty acid radicals, said film-forming base containing as a drier a material selected from the group consisting of o-phenanthroline, o-phenanthroline monohydrate and alpha, alpha'-dipyridyl.

2. The composition of claim 1, in which the film-forming base contains a pigment.

3. The composition of claim 2, in which the pigment is titanium dioxide.

4. The composition of claim 3, in which the film-forming base contains a metallic drier.

5. The composition of claim 4, in which the ester contains a fatty acid radical derived from linseed oil.

6. The composition of claim 5, in which the film-forming base contains a linseed oil modified glycerol-phthalate resin.

7. The composition of claim 6, in which said material is o-phenanthroline monohydrate.

8. A film-forming base, of the type commonly employed in varnishes, enamels, paints, printing inks and linoleum print paints, prepared from an ester of a saturated, aliphatic, polyhydric alcohol, said ester containing a substituent selected from the group consisting of the drying and semi-drying oil fatty acid radicals, said film-forming base containing carbon black as a pigment and also containing as a drier a material selected from the group consisting of o-phenanthroline, o-phenanthroline monohydrate and alpha, alpha'-dipyridyl.

9. The composition of claim 8, in which the film-forming base contains a metallic drier.

10. The composition of claim 9, in which the ester contains a fatty acid radical derived from linseed oil.

11. The composition of claim 10, in which the film-forming base contains a linseed oil modified glycerol-phthalate resin.

12. The composition of claim 11, in which said material is o-phenanthroline monohydrate.

13. A film-forming base, of the type commonly employed in varnishes, enamels, paints, printing inks and linoleum print paints, containing o-phenanthroline monohydrate as a drier, said film-forming base being prepared from an ester of a saturated, aliphatic, polyhydric alcohol, said ester containing a substituent selected from the group consisting of the drying and semi-drying oil fatty acid radicals.

14. A film-forming base, of the type commonly employed in varnishes, enamels, paints, printing inks and linoleum print paints, prepared from an ester of a saturated, aliphatic, polyhydric alcohol, said ester containing a fatty acid radical derived from linseed oil, said film-forming base containing as a drier a material selected from the group consisting of o-phenanthroline, o-phenanthroline monohydrate and alpha, alpha'-dipyridyl.

15. The composition of claim 14, in which the film-forming base contains a linseed oil modified glycerol-phthalate resin.

16. A film-forming base, of the type commonly employed in varnishes, enamels, paints, printing inks and linoleum print paints, prepared from an ester of a saturated, aliphatic, polyhydric alcohol, said ester containing a fatty acid radical derived from dehydrated castor oil, said film-forming base containing as a drier a material selected from the group consisting of o-phenanthroline, o-phenanthroline monohydrate and alpha, alpha'-dipyridyl.

17. The composition of claim 16, in which the film-forming base contains a pigment.

18. The composition of claim 17, in which the pigment is titanium dioxide.

19. The composition of claim 18, in which the film-forming base contains a metallic drier.

20. The composition of claim 19, in which said material is o-phenanthroline monohydrate.

GORDON K. WHEELER.

REFERENCES CITED

The following references are of record in the file of this patent:

UNITED STATES PATENTS

| Number | Name | Date |
|---|---|---|
| 2,075,230 | Schatz | Mar. 30, 1937 |

OTHER REFERENCES

Nicholson: "Drying of Linseed Oil Paint," Industrial and Eng. Chem., vol. 34, pages 1175–1179.